United States Patent [19]

Kawanabe et al.

[11] Patent Number: 5,288,966
[45] Date of Patent: Feb. 22, 1994

[54] WIRE-CUT ELECTRICAL DISCHARGE MACHINE HAVING WIRE ELECTRODE CUTTING DEVICE

[75] Inventors: Tasuku Kawanabe; Tetsuya Aoki, both of Nagoya, Japan

[73] Assignee: Brother Kogyo Kabushiki Kaisha, Nagoya, Japan

[21] Appl. No.: 992,906

[22] Filed: Dec. 18, 1992

[30] Foreign Application Priority Data

Jan. 27, 1992 [JP] Japan .................. 4-12249

[51] Int. Cl.⁵ ............... B23H 7/02; B23H 7/10
[52] U.S. Cl. ............................................. 219/69.12
[58] Field of Search .............. 219/69.12, 69.15, 69.17

[56] References Cited

U.S. PATENT DOCUMENTS

| | | | |
|---|---|---|---|
| 4,412,118 | 10/1983 | Nomura et al. | 219/69.12 |
| 4,618,761 | 10/1986 | Inoue et al. | 219/69.15 |
| 4,698,478 | 10/1987 | Girardin | 219/69.12 |
| 4,748,310 | 5/1988 | Aso et al. | 219/69.12 |
| 4,778,972 | 10/1988 | Josserand | 219/69.12 |
| 4,783,583 | 11/1988 | Obara et al. | 219/69.12 |
| 4,877,935 | 10/1989 | Aso et al. | 219/69.12 |
| 4,929,810 | 5/1990 | Kawase | 219/69.12 |
| 4,998,003 | 3/1991 | Kawanabe | 219/69.12 |
| 4,999,473 | 3/1991 | Gamo et al. | 219/69.12 |
| 5,130,508 | 7/1992 | Umetsu et al. | 219/69.12 |

FOREIGN PATENT DOCUMENTS

| | | | |
|---|---|---|---|
| 58-132421 | 8/1983 | Japan | 219/69.12 |
| 58-177234 | 10/1983 | Japan . | |
| 59-209725 | 11/1984 | Japan . | |
| 62-287934 | 12/1987 | Japan . | |
| 63-11232 | 1/1988 | Japan . | |
| 63-11233 | 1/1988 | Japan . | |
| 63-120034 | 5/1988 | Japan | 219/69.12 |
| 63-123632 | 5/1988 | Japan | 219/69.12 |
| 63-300823 | 12/1988 | Japan . | |
| 63-300824 | 12/1988 | Japan . | |
| 2-237724 | 9/1990 | Japan . | |
| 3-190626 | 8/1991 | Japan | 219/69.12 |

*Primary Examiner*—Geoffrey S. Evans
*Attorney, Agent, or Firm*—Oliff & Berridge

[57] ABSTRACT

A cutting mechanism for use in an electrical discharge cutting machine that has a frame mounting a wire electrode cutter, a pair of rollers to feeder the wire electrode and a sensor for detecting the presence of the wire electrode. The frame can be moved from side-to-side so that it may be positioned to feed the wire electrode to a machining zone or to a disposal box when a portion of the wire electrode is to be cut off following a breakage of the wire electrode.

18 Claims, 6 Drawing Sheets

| ITEM | INSTRUCTIONS |
|---|---|
| S11 | INITIALIZATION |
| S12 | ELECTRICAL DISCHARGE MACHINING |
| S13 | WIRE ELECTRODE BROKEN OFF? |
| S14 | TURN OFF MAGNETIC BRAKE AND REWIND WIRE ELECTRODE BY DRIVING MOTOR |
| S15 | OFF SIGNAL OUTPUT FROM SENSOR? |
| S16 | STOP DRIVING MOTOR |
| S17 | ROTATE POSITIVELY MOVING MOTOR TO MOVE FRAME TOWARD DIRECTION INDICATED ARROW E |
| S18 | TURN ON FIRST SOLENOID |
| S19 | START TIMER |
| S20 | DRIVE FEEDING MOTOR |
| S21 | T ≧ T1? |
| S22 | EXCITE MAGNETIC BRAKE AT MAXIMUM BRAKING POWER |
| S23 | TURN ON SECOND SOLENOID |
| S24 | TURN ON SWITCH |
| S25 | OFF SIGNAL OUTPUT FROM SENSOR? |
| S26 | TURN OFF SWITCH |
| S27 | TURN OFF SECOND SOLENOID |
| S28 | TURN OFF FIRST SOLENOID AND STOP FEEDING MOTOR |
| S29 | ROTATE NEGATIVELY MOVING MOTOR TO TURN FRAME IN ITS ORIGINAL POSITION |

WIRE-CUT ELECTRICAL DISCHARGE MACHINE HAVING WIRE ELECTRODE CUTTING DEVICE

BACKGROUND OF THE INVENTION

1. Field of the Invention

The invention relates to a wire-cut electrical discharge machine, more particularly, to a wire-cut electrical discharge machine having a wire electrode cutting device capable of cutting off a predetermined length of a wire electrode, which is broken by an accident, before rethreading the wire electrode.

2. Description of the Related Art

In the wire-cut electrical discharge machine, electrical discharge pulses are supplied in a machining zone between a wire electrode and a workpiece in order to cut a complex shape from the workpiece. In such a wire-cut electrical discharge machine, there is a need to forcibly cut off the wire electrode in two cases under ordinary working conditions. For example, after one workpiece has been cut, a new workpiece is to be set for cutting. At this time, the wire electrode must be forcibly cut off to smooth the wire electrode so that it can be placed into a starting position of the new workpiece. A similar case occurs when the wire electrode needs to be forcibly cut off because there is a pattern comprising several parts disposed independently of each other. To cut out the pattern from the workpiece, one part is first cut from the workpiece and, prior to cutting the next part from the workpiece, the wire electrode must be forcibly cut off so that the wire electrode can be placed into a starting position for that next part.

To cut the workpiece, electrical discharge pulses are supplied in the machining zone between the wire electrode and the workpiece. However, if the electrical discharge repeatedly occurs at the same point of the wire electrode, there is a probability that the wire electrode will break at that point. Upon such a accidental breakage of the wire electrode, a predetermined length of the wire electrode must be cut off before the wire electrode is rethreaded. Especially when the wire electrode is broken by the accident, such as described above, the breaking point of the wire electrode (the pointed head of the wire electrode) or the periphery thereof is usually deformed by the electrical discharges occurring in the machining zone between the wire electrode and the workpiece. Therefore, it is difficult to direct the wire electrode, whose point head is deformed and ragged, into a small wire guide of the wire-cut electrical discharge machine or into the starting position on the workpiece, that is, it is difficult to rethread the wire electrode in the wire-cut electrical discharge machine.

As a result, in the wire-cut electrical discharge machine, following a breakage, a predetermined length of the deformed wire electrode is cut off and scrapped. Then, since the wire electrode is sharp at the pointed head thereof, it is relatively simple to insert the wire electrode into the wire guide and to rethread the wire electrode in the wire-cut electrical discharge machine. Several types of wire electrode cutting devices capable of automatically executing the above-mentioned operations have been disclosed.

As a type of wire electrode cutting device, there is the wire electrode cutting device disclosed in U.S. Pat. No. 4,698,478. According to the disclosure of that wire electrode cutting device, the wire electrode to be cut off is tensioned between a brake device and a clamp device. The brake device is used for applying a back tension to the wire electrode upstream in the feeding direction of the wire electrode for machining. The rolling-type clamp device is disposed above the workpiece. The tensioned wire electrode is cut off by a cutting device disposed above the clamp device, and the bundle of scrap wire around the clamp is pushed off so as to fall in a disposal chute.

According to the above-mentioned structure, the pointed head of the broken-down wire electrode is wound around the clamp device so as to apply the tension. Therefore, after the wire electrode is cut off, the scrap wire electrode is tightly wound around the clamp device so that it is very difficult to push the bundle of scrap wire off the clamp device. As a result, the scrap wire push-off disposal device becomes very complex.

A wire-cut electrical discharge machine capable of solving the above-mentioned problems is disclosed in Japanese Laid-Open Patent Publication No. 2-237724. In the disclosed wire-cut electrical discharge machine, a supply bobbin for holding the wire electrode, a brake for applying a braking force to the wire electrode, a cutting device having a pair of welding electrodes, a pair of tension rollers, a disposal box beside the tension rollers, and a detection circuit for detecting a breakage of the wire electrode are provided.

The wire electrode is fed from the supply bobbin across the brake and around a direction change pulley to a point where it is held by a pair of clamp rollers immediately above the cutting device. Immediately below the cutting device are the pair of tension rollers between which the wire electrode is passed. One of the pair of tension rollers is driven by a motor in a feeding direction for feeding the wire electrode. Provided immediately to the side of the pair of tension rollers is the disposal box.

When the wire electrode is to be cut, the brake is applied and the driven tension roller continues to feed the wire electrode thereby applying a tension to the wire electrode between the brake and the tension rollers. With the tension applied, the wire electrode is cut by the welding electrodes. At that time, the motor driving the driven tension roller must be reversed to feed the cut off broken portion of the wire electrode in a direction opposite to the feed direction so that it may be received in the disposal box. Thus, the timing for reversal of the motor driving the driven tension roller is critical, if the separation between the welding electrodes and the tension rollers is comparatively small, or the cut off broken portion of the wire electrode will be fed into the machining zone, and released from the tension rollers, before the reversal of the motor and the driven tension roller.

On the other hand, should the distance between the welding electrodes and the pair of tension rollers be large, so as to reduce the timing criticality, the machine will be unnecessarily and undesirably enlarged. In either case, the need to reverse the motor and the driven tension roller so as to dispose of the cut off broken portion of the wire electrode increases the complexity and the cost of the apparatus.

SUMMARY OF THE INVENTION

It is therefore an object of the invention to provide a wire electrode cutting device that can certainly dispose of the cut off broken portion of the wire electrode in a simple manner without increasing the size of the machine or its complexity while minimizing the cost of the machine.

To achieve the above-mentioned object, the wire-cut electrical discharge machine for cutting a workpiece by an electrical discharge, between a wire electrode and the workpiece, in a machining zone comprises: a pulley around which the wire electrode is guided; a brake means for selectively applying a one of a braking power during electrical discharge machining and a larger braking power during cutting to the pulley; a feeding means disposed between the pulley and the workpiece for applying a feeding power to the wire electrode in a direction toward the workpiece; a cutting means for cutting off the wire electrode between the pulley and the feeding means; and a control means for controlling the brake means, feeding means and cutting means such that the cutting means cuts off the wire electrode after the brake means applies the braking power during cutting to the pulley and the feeding means applies a feeding power to the wire electrode thereby applying tension to the wire electrode between the pulley and the feeding means. Further, the control means controls the feeding means such that the feeding means continuously applies the feeding power in the direction to the wire electrode after the wire electrode is cut by the cutting means thereby disposing of the cut off portion of the wire electrode.

According to the wire-cut electrical discharge machine of the invention, the pulley around which the wire electrode is guided is applied the large braking power for cutting by the brake means and the pulley stops the feeding of the wire electrode. Further, the wire electrode is applied the sufficient tension by the feeding means. After the wire electrode is cut, the feeding means applies the feeding power in the same direction as before the wire electrode is cut in order to dispose of the cut off portion of the wire electrode. Therefore, the cut off portion of the wire electrode is certainly disposed of in a simple manner.

BRIEF DESCRIPTION OF THE DRAWINGS

A preferred embodiment of the invention will be described in detail with reference to the following figures wherein.

DETAILED DESCRIPTION OF THE PREFERRED EMBODIMENT

Hereinafter, an embodiment of the invention will be explained with reference to FIGS. 1 through 5B.

Figure 1:
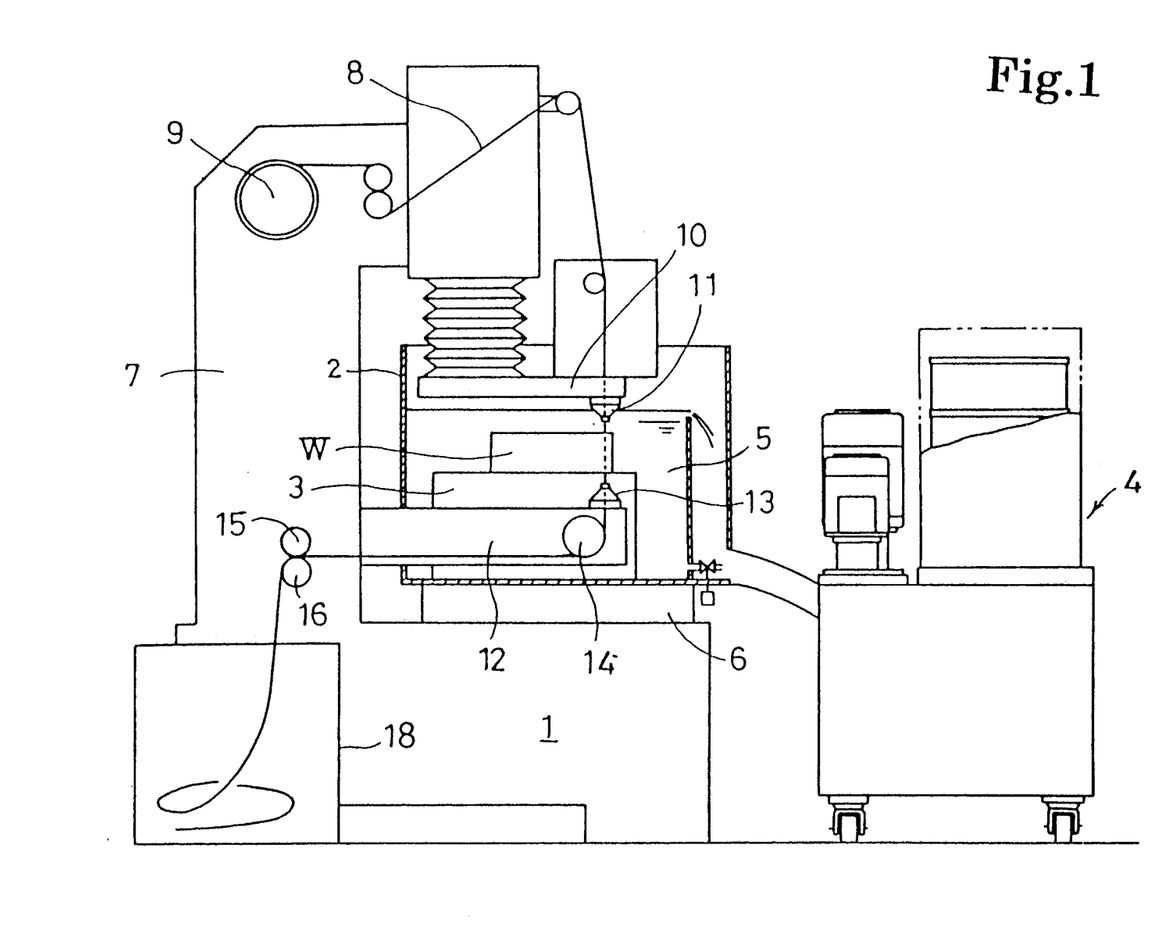
FIG. 1 is a schematic side view of a wire-cut electrical discharge machine.

As shown in FIG. 1, in the wire-cut electrical discharge machine, a work tank 2 is sent on a base through a X-Y feed table 6. A workpiece W is put on a work table 3, which is fixed into the work tank 2, and the work tank 2 is flooded with machining fluid 5 having an insulative property (fresh water or fluid mixed with fresh water and oil). The machining fluid 5 is supplied into the work tank 2 from a machining fluid supplying device 4 in a known manner as described below. While machining, the machining fluid 5 becomes polluted. Therefore, the polluted machining fluid 5 is returned from the work tank 2 to the machining fluid supplying device 4, again in a known manner. After this, the polluted machining fluid 5 is passed through a filter and is again supplied to the work tank 2. Moreover, the X-Y feed table 6 is driven by a driving device (not shown) so that the workpiece W is moved with the work tank 2.

A wire bobbin 9 on which a wire electrode 8 is wound is disposed in the upper portion of a column 7. An upper nozzle 11 is disposed under an upper arm 10 which is supported by the column 7. A lower nozzle 13 is provided on a lower arm 12 which is supported on the lower portion of the column 7. The wire electrode 8, which is pulled from the wire bobbin 9, is disposed longitudinally from the upper nozzle 11 toward the lower nozzle 13 through the workpiece W. When electrical discharge pulses are supplied to the wire electrode 8 and the workpiece W by a power supply (not shown), electrical discharges occur in a small space (machining zone) between the wire electrode 8 and the workpiece W so that the workpiece W is cut.

To supply the machining fluid 5 to work tank 2 from the machining fluid supplying device 4, machining fluid 5 is jetted from at least one side of the upper nozzle 11 and the lower nozzle 13 toward the machining zone so that metal dust, that is generated during machining, is removed and the machining zone is cooled.

The wire electrode 8 is a fine line. A common wire electrode 8 has a diameter of about 0.05 mm–0.3 mm. The feeding speed (moving speed) of the wire electrode 8 is changed according to the machining conditions and the thickness of the workpiece W. For example, when the workpiece W to be cut is 50 mm thick, the feeding speed is 100–300 mm/second.

A guide pulley 14 is disposed below the lower nozzle 13. After the feeding direction of the used wire electrode 8 is changed toward a substantially horizontal direction by the guide pulley 14, the wire electrode 8 is held between a pair of rollers 15 and 16 so as to be forcibly fed into a receiving box 18. At least one roller of the rollers 15, 16 is driven to rotate by a receiving motor 61 shown in FIG. 3.

Figure 2:
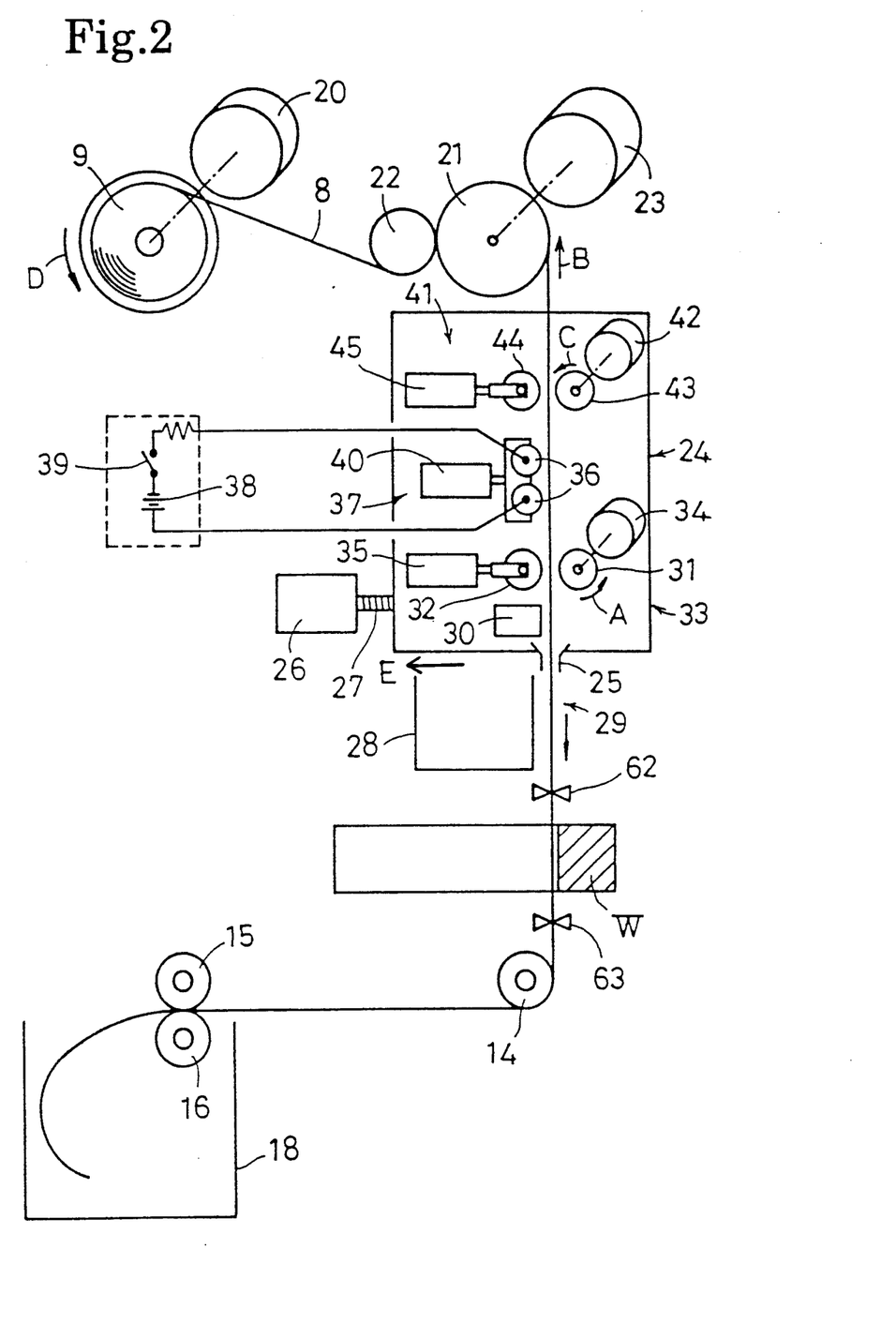
FIG. 2 is a main portion, partly sectional side view of the wire electrode cutting disposal portion.

Next, the supplying device for supplying the wire electrode 8 will be explained with reference to FIG. 2. The wire bobbin 9 rotates in a positive direction so as to feed the wire electrode 9 downward during machining. However, a driving motor 20 applies a counter torque to the wire bobbin 9 such that the wire bobbin 9 would, if able, rotate in a negative, or reverse, direction. A pair of pulleys 21 and 22 is disposed between the wire bobbin 9 and the workpiece W. A magnetic brake 23 is connected to the pulley 21. Therefore, during machining, the wire electrode 8, between the wire bobbin 9 and the pair of pulleys 21,22, has applied thereto a pretension. Further, the main tension is applied to the wire electrode 8 between the pair of pulleys 21,22 and the pair of rollers 15,16. U.S. patent application Ser. No. 07/874,017, filed Apr. 27, 1992, discloses such a structure and that disclosure is incorporated by reference. Therefore, when the wire electrode 8 is broken, the wire electrode 8 is fed in the direction indicated by an arrow B, because of the counter torque of driving motor 20, and the wire electrode 8 is rewound on the wire bobbin 9. Then, braking power is applied when the magnetic brake 23 is turned on. The braking power is changed according to the voltage applied to the magnetic brake 23. While machining, the magnetic brake 23 is excited at a predetermined braking power in order to provide the main tension. When the wire electrode 8 is broken, the magnetic brake 23 is excited at a maximum braking power.

A frame 24 is slidably disposed on a main frame (not shown) between the tension applying device consisting of rollers 21,22 and magnetic brake 23 and an upper guide 62 disposed above the workpiece W. The tension applying device applies the braking power while being applied a voltage. A wire guide 25 is formed on the lower portion of the frame 24. A screw shaft 27, which is driven by a moving motor 26, is connected to the frame 24. The frame 24 is moved from side to side by the screw shaft 27 as driven by the moving motor 26. A disposal box 28, for storing a scrap wire electrode which was forcibly cut off, is disposed between the frame 24 and the upper guide 62. A processing passage 29, through which the wire electrode 8 is passed while machining, is disposed adjacent to the disposal box 28.

A sensor 30, for detecting the wire electrode 8, is disposed on the frame 24, above the wire guide 25. A lower wire driving device 33 is disposed above the sensor 30 and comprises a lower feeding roller 31 and a lower pinch roller 32. The lower feeding roller 31 is rotated, in the direction indicated by an arrow A, by a feeding motor 34, a step motor, through a transmission mechanism having an endless belt. The lower pinch roller 32, which is disposed in an opposing relationship with the lower feeding roller 31, is connected to a linear first solenoid 35. When the coil of the first solenoid 35 is excited (turned on), the pinch roller 32 is projected toward the lower feeding roller 31 so as to hold the wire electrode 8 therebetween. When the coil of the first solenoid 35 is turned off, the pinch roller 32 retracts, under the influence of a spring (not shown), from the lower feeding roller 31 so as to be returned to its original position.

The cutting device 37 comprises welding electrodes 36,36 and a linear second solenoid 40. The welding electrodes 36,36 are pressed against the wire electrode 8 by the linear second solenoid 40. When a switch 39, which is connected to the weld cutting electrodes 36,36 is turned on, an electrical current from a power supply 38 for cutting the wire electrode 8 is sent to the wire electrode 8 through the welding electrodes 36,36. Then, as a result of Joule heat applied to the wire electrode 8, the wire electrode 8 is cut.

Above the cutting device, an upper wire driving mechanism 41 is provided on the frame 24. The upper wire driving mechanism 41 comprises an upper feeding roller 43 and an upper pinch roller 44. The upper feeding roller 43 is rotated, in the direction indicated by an arrow C, by a transmitting motor 42, a step motor. The upper pinch roller 44 can be pressed against the upper feeding roller 43 to grip the wire electrode therebetween. To do so, the upper pinch roller 44 is connected to a linear third solenoid 45. When the coil of the third solenoid 45 is excited (turned on), the upper pinch roller 44 is projected toward the upper feeding roller 43 so that the wire electrode 8 is held between the upper pinch roller 44 and the upper feeding roller 43. When the coil of the third solenoid 45 is turned off, the upper pinch roller 44 retracts, under the influence of a spring (not shown) from the upper feeding roller 43 so as to return to its original position. The upper wire driving mechanism 41 is used only for feeding the wire electrode 8 downward when the wire electrode 8 is to be rethreaded. Therefore, the upper wire driving mechanism 41 is not operated while machining.

Figure 3:
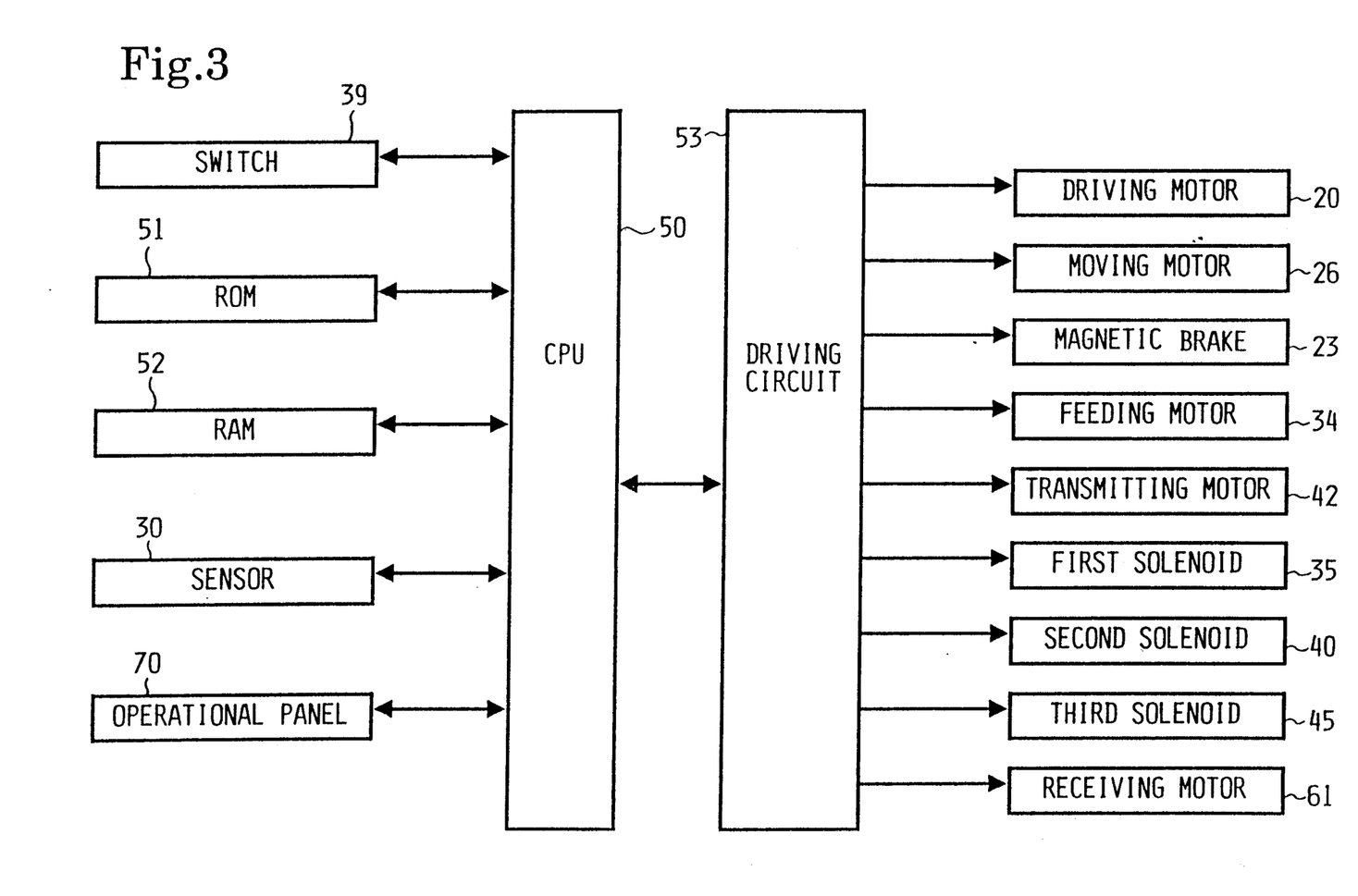
FIG. 3 is a block diagram of a control device.

As shown in FIG. 3, the control device for the wire-cut electrical discharge machine comprises a central processing unit (CPU) 50, a read only memory (ROM) 51 for storing a control program for the wire-cut electrical discharge machine and a control program for cutting and disposing of the wire electrode 8, a random access memory (RAM) 52 for storing various data temporarily and an interface (not shown). The sensor 30 for detecting the wire electrode 8, the switch 39 of the cutting device and an operational panel 70 are also connected to the CPU 50. Further, the driving motor 20, the moving motor 26, the magnetic brake 23, the feeding motor 34, the transmitting motor 42, the first solenoid 35, the second solenoid 40 and the third solenoid 45 are respectively connected to the CPU 50 thorough the driving circuit 53.

Figure 4:
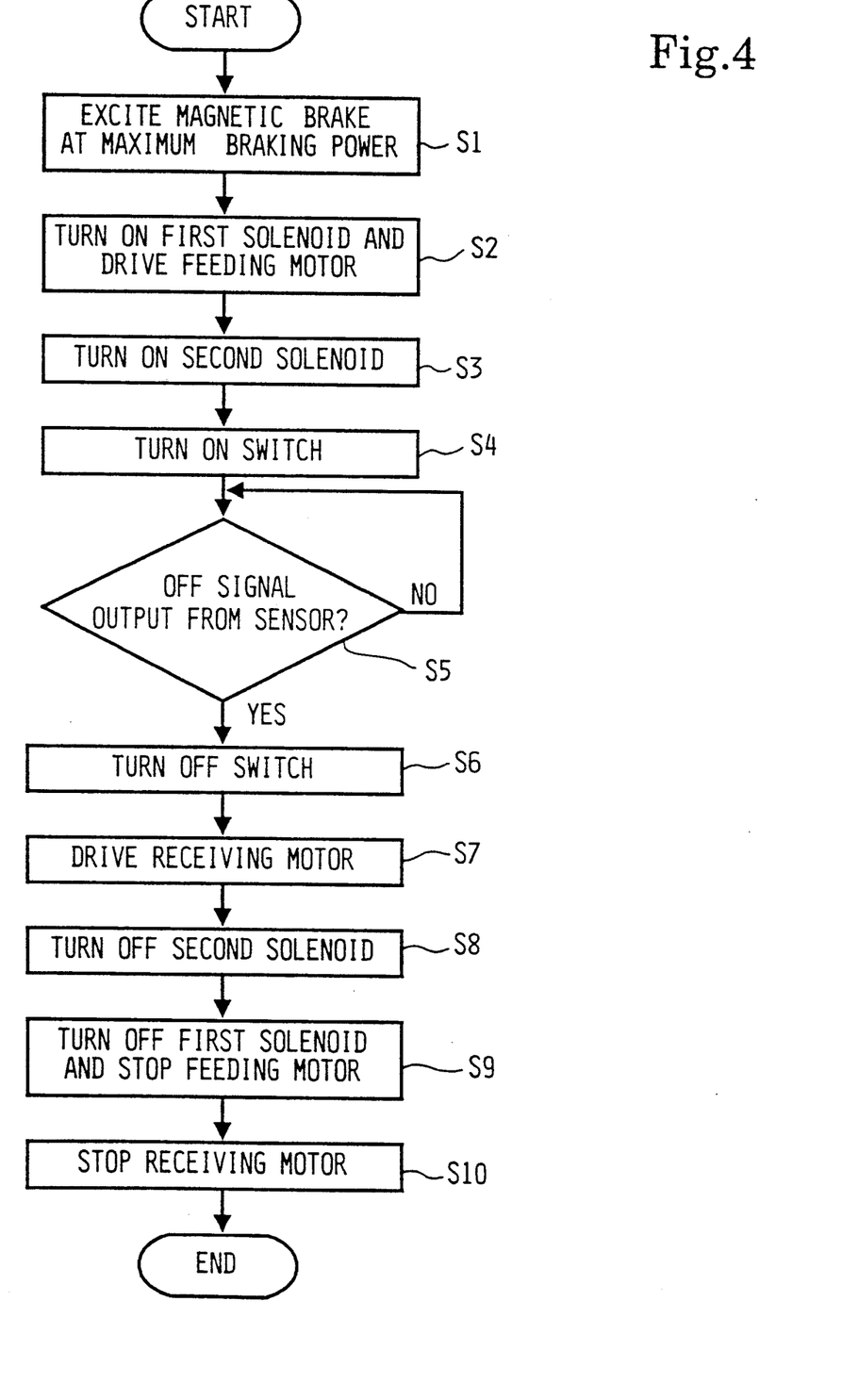
FIG. 4 is a flowchart of an operation for cutting off a wire electrode when electrical discharge machining is safely completed.

Next, the control for forcibly cutting off the wire electrode, after the electrical discharge machining has been safely completed, will be explained with reference to the flowchart of the FIG. 4.

When the electrical discharge machining is completed, the wire electrode 8 extends from the wire bobbin 9 to the pair of rollers 15,16. When an operator inputs a cutting start command, through the operational panel 70, the magnetic brake 23 is excited at a maximum breaking power. Then, the pulley 21 cannot rotate and the wire electrode 8 is not fed (S1). Next, the first solenoid 35 is excited so that the lower pinch roller 32 is projected toward the lower feeding roller 31. At this time, the lower feeding motor 31 is driven by feeding motor 34 (S2). Thus, tension is applied to the wire electrode 8 between the pair of the pulleys 21,22 and the pair of rollers 31,32. Under this condition, when the second solenoid 40 is excited, the welding electrodes 36,36 come in contact with the wire electrode 8 (S3). Next, the switch 39 is turned on (S4) and the electrical current for cutting the wire electrode 8 is sent to the welding electrodes 36,36. By Joule heat, the wire electrode 8 is cut. Since the lower feeding roller 31 is being driven to rotate, the scrap wire electrode 8 is fed toward the workpiece W side.

Next, the CPU 50 determines whether the output signal from the sensor 30 is OFF, that is, whether the rear edge of the scrap wire electrode 8 has passed in front of the sensor 30 (S5). When the judgement in step S5 is NO, the cutting operation is continued. When the judgement in step S5 is YES, that is, when the rear edge of the scrap wire electrode 8 passes through the wire guide 25, the switch 39 is turned off (S6) and when the receiving motor 61 is driven (S7), the pair of rollers 15, 16 are rotated, so that the scrap wire electrode 8 on the workpiece W side is fed into the receiving box 18. The second solenoid 40 is then turned off and the welding electrodes 36,36 are drawn back to their original position (S8). Further, the feeding motor 34 is stopped and, simultaneously, the first solenoid 35 is turned off so that the lower pinch roller 32 is drawn back (S9) from lower feeding roller 31. When a predetermined time lapses, the receiving motor 61 stops driving (S10).

By the above-mentioned operation, the cutting operation for forcibly cutting off the wire electrode is completed. While cutting off the wire electrode, the frame 24 is not moved. The operation following the above-described cutting operation is not shown in the flowchart. However, after cutting, the automatic rethreading operation for feeding the lead edge of the wire electrode 8 toward the upper guide 62 is executed.

Figure 5A:
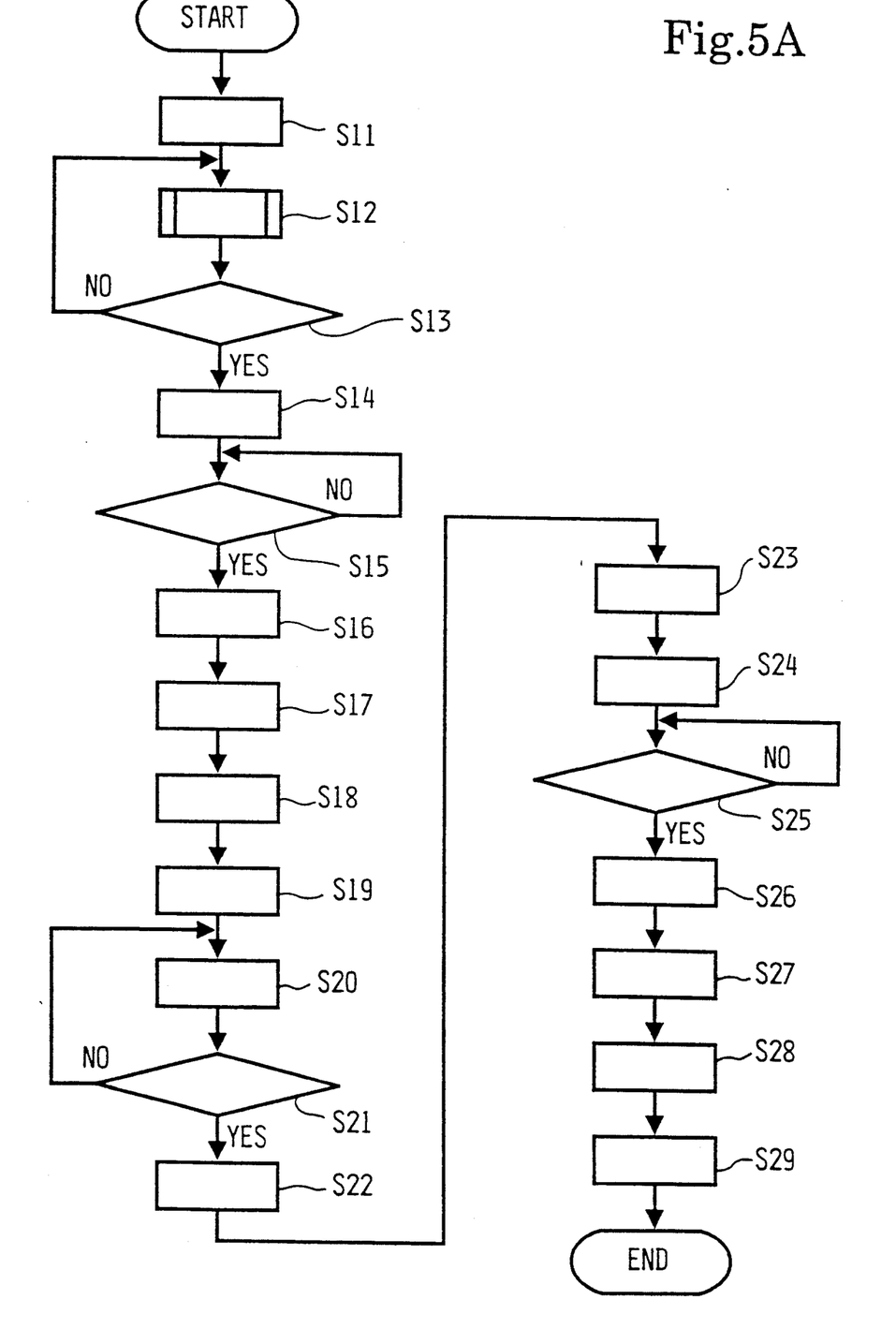
FIG. 5A is a flowchart of an operation for cutting off and disposing of the broken-down wire electrode.
Figure 5B:
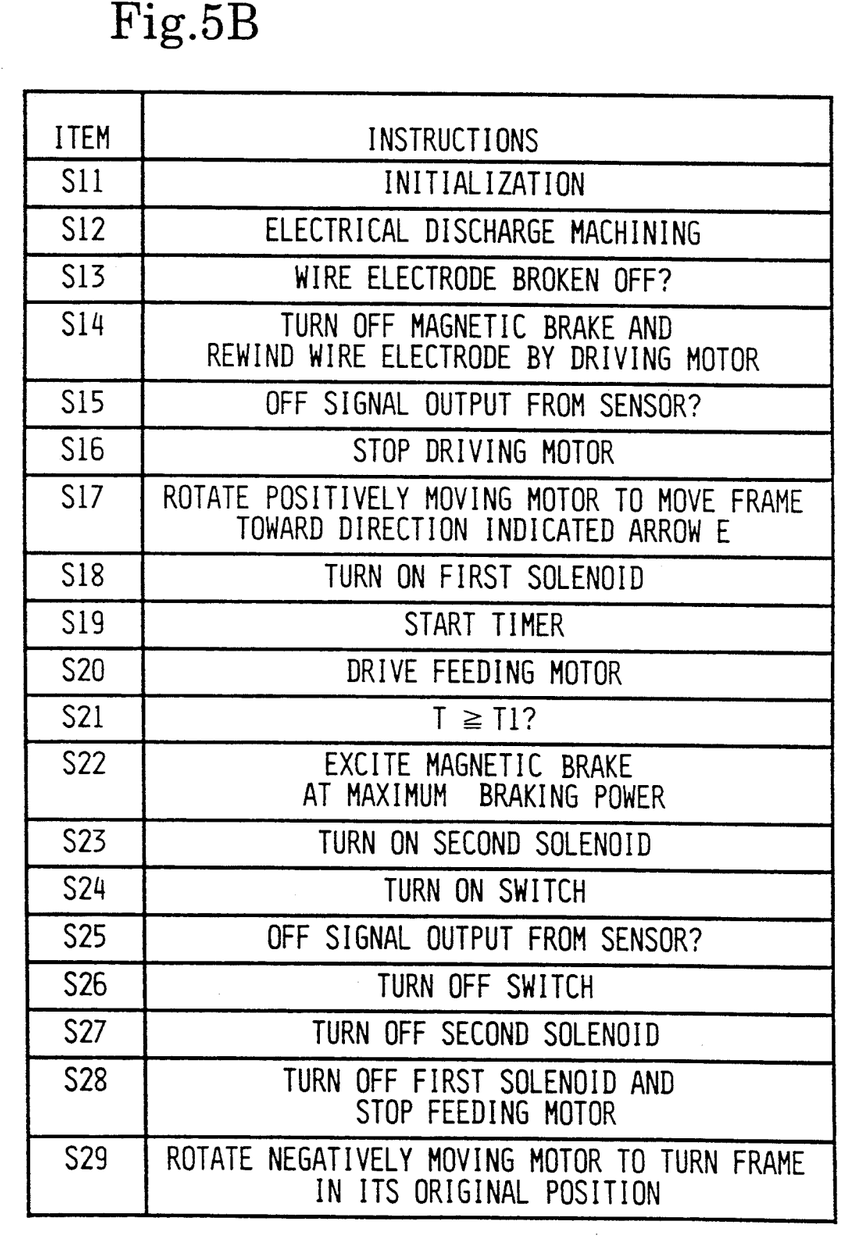
FIG. 5B is a table of labels for the steps of the flowchart of FIG. 5A.

Next, the operation for cutting and disposing of the unusable length of the wire electrode 8, when the wire electrode 8 has been broken by an accident, will be explained with reference to the flowchart of FIGS. 5A and 5B.

When the start button of the operational panel 70 is operated, an initialization is executed (S11) and the electrical discharge machining is executed (S12). While machining, the driving motor 20 applies a torque to the wire bobbin 9 for causing the wire bobbin 9 to try to rotate in the direction, indicated by an arrow D counter to the feed force applied by the pair of rollers 15,16. Therefore, the wire electrode 8 has applied the pretension. Moreover, since the wire electrode 8 is detected by the sensor 30 for detecting the wire electrode, the output signal from the sensor 30 is ON.

The CPU 50 continuously determines whether the wire electrode 8 is broken in the machining zone between the wire electrode 8 and the workpiece W (S13). Since, the driving motor 20 applies the torque to the wire bobbin 9 such that the wire electrode 8 would be rewound onto the wire bobbin 9, a force is applied to the wire electrode 8 in the direction indicated by the arrow B to apply the tension. Therefore, when the wire electrode 8 is broken, the current supplied to the driving motor 20 is decreased according to the decrease of duty. Therefore, the accidental rupture of the wire electrode 8 can be detected by the decrease in the supplied current. Alternatively, a rotational sensor (not shown) may be used to detect the rotational condition of the pulley 21. The rotational sensor is provided to the magnetic brake. Then, when the wire electrode 8 is broken off and rewinds on the wire bobbin 9, the rotational sensor detects that the rotational condition of the pulley 21 has changed thereby detecting the accidental rupture of the wire electrode 8.

When the current supplied to the driving motor 20 is decreased and the CPU 50 determines that the wire electrode 8 is broken (S13: YES), the magnetic brake 23 is turned off. Then, since the wire bobbin 9 can be rotated by the driving motor 20, the wire electrode 8 is pulled toward the direction indicated by the arrow D (S14). The CPU 50 then determines whether the output signal from the sensor 30 for detecting the wire electrode is OFF (S15). When the wire electrode 8 is rewound in the wire bobbin 9 and the pointed head of the broken-off wire electrode 8 is positioned above the sensor 30, the output signal from the sensor 30 is turned OFF. When the output signal from the sensor 30 is OFF (S15: YES), the CPU 50 stops driving the driving motor 20 (S16). On the other hand, when the output signal from the sensor 30 is ON, the wire electrode 8 is further rewound onto the wire bobbin 9.

Next, the CPU 50 drives the moving motor 26 such that the moving motor 26 rotates positively so that the frame 24 is moved in the direction indicated by an arrow E (S17). As a result, the lower opening of the wire guide 25, disposed in the lower portion of the frame 24, faces the disposal box 28. At this time, the CPU 50 excites the first solenoid 35 so that the wire electrode 8 is held between the lower feeding roller 31 and the lower pinch roller 32 (S18). Next, the CPU 50 starts a timer provided in the CPU 50 (S19), and drives the feeding motor 34 such that the feeding motor 34 rotates positively in the direction indicated by the arrow A (S20). During the feeding, the pointed head of the broken-down wire electrode 8 is fed toward the disposal box 28. When the pointed head of the wire electrode 8 passes in front of the sensor 30 and is fed further downward, the output signal from the sensor 30 becomes ON.

The CPU 50 determines whether a predetermined time period T1 has lapsed, that is, whether the value T of the timer, exceeds the time period T1 stored in the ROM 51 (S21). When the time period T1 has lapsed, the pointed head of the wire electrode 8, which is detected by the sensor 30, has been fed downward a predetermined length. The predetermined length is set so as to include all of the unusable length of the wire electrode 8 which was ruptured by the accident or the electrical discharge machining. Usually, the time period T1 is set such that the wire electrode 8 is fed about 100–120 mm. The time period T1 is stored beforehand in the ROM 51.

When the CPU 50 determines that the time period T1 has lapsed (S21: YES), the magnetic break 23 is excited and the pulley 21 is applied the maximum breaking power so that the wire electrode 8 is no longer fed downward (S22). When the judgement in step S21 is NO, the CPU 50 continues the feeding operation of step S20 until the time period T1 lapses. Then, when the predetermined length of the broken-off wire electrode 8 has been fed downward, the magnetic break 23 applies the maximum breaking power to the pulley 21 of the tension applying device comprising the pulleys 21,22 and the magnetic brake 23. Then, the wire electrode 8 is immovably fixed at the pulley 21 (S22). On the other hand, since the lower feeding roller 31 of the lower wire mechanism 33 is driven in step S20, the broken-down wire electrode 8, between the tension applying device and the lower wire driving mechanism 33, is applied with tension. At this time, the CPU 50 excites the second solenoid 40 such that the welding electrodes 36, 36 come into contact with the wire electrode 8 (S23). When the switch 39 is turned on, current for cutting the wire electrode 8 is sent to the welding electrodes 36,36 and the wire electrode 8 is cut off (S24). Since the wire guide 25 of the frame 24 faces to the disposal box 28, and the feeding roller 31 continues to rotate, the scrap wire electrode 8 is automatically fed into the disposal box 28.

The CPU 50 now determines whether the output signal from the sensor 30 is OFF, that is, whether the rear edge of the scrap wire electrode 8 has passed in front of the sensor 30 (S25). When the judgement in step S25 is NO, the welding electrodes 36, 36 continue cutting the wire electrode 8. When the judgement in step S25 is YES, that is, substantially when the rear edge of the scrap wire electrode 8 passes through the wire guide 25, the CPU 50 turns off the switch 39 (S26). The second solenoid 40 is turned off so that the welding electrodes 36, 36 are drawn back to their original position (S27) and the scrap wire electrode 8, which has passed between the lower feeding roller 31 and the lower pinch roller 32, falls into the disposal box 28 according to the dead weight thereof. At that time, the operation for cutting and disposing of the wire electrode is completed.

The CPU 50 stops driving the feeding motor 34 and turns off the first solenoid 35 so that the lower pinch roller 32 is drawn back to its original position (S28). By the above-described operation, the operation for cutting off the broken wire electrode 8 is completed.

After this, the CPU 50 drives the moving motor 26 such that the moving motor 26 rotates negatively or reversely and the frame 24 is moved in the reverse direction to that indicated by the arrow E to return to its original position. In that position, the wire guide 25 faces the processing passage through which wire electrode passes during machining (S29).

As mentioned above, since the wire electrode 8, to which the tension is applied is cut off, the wire electrode 8 is sharp at the pointed head thereof. Therefore, it is easy to thread the wire electrode 8 into the upper guide 62, the starting position on the workpiece W and a lower guide 63.

As alternatives to the linear solenoids 35, 40 and 45, rotational solenoids may be used. When the coil of the rotational solenoid is excited, the rotational plate of the rotational solenoid rotates through a predetermined angle. The pinch roller is connected to the rotational plate via a lever which rotates about on a shaft. Thus, when the coil of the rotational solenoid is excited, the wire electrode 8 is held between the pinch roller and the feeding roller and when the coil of the rotational solenoid is turned off, the rotational plate is returned to its original position under the influence of a spring which is built into the rotational solenoid. Moreover, as the cutting device, a stationary knife fixed to the frame 24 and a moving knife moved by a solenoid may be used. In addition, if the wire electrode is repeatedly bent, the wire electrode may be cut off as a result of metal fatigue.

It may be that the frame 24 is pivotably supported. In that case, the frame 24 is connected to a solenoid or an actuator, such as a motor, through a cam or a lever. The frame 24 can then be moved between the processing position where the wire guide 25 faces to the processing passage or the disposal position where the wire guide 25 faces the disposal box 28.

What is claimed is:

1. A wire-cut electrical discharge machine for cutting a workpiece by the occurrence of an electrical discharge in a machining zone between a wire electrode and the workpiece, comprising:
   a pulley around which said wire electrode is guided;
   brake means for selectively applying a one of a braking power during electrical discharge machining and a larger braking power during cutting to said pulley;
   feeding means disposed between said pulley and the workpiece for applying a feeding power to the wire electrode in a direction toward the workpiece;
   cutting means for cutting off the wire electrode between said pulley and said feeding means;
   a disposal box for receiving cut-off wire electrode, said disposal box positioned between said feeding means and the workpiece located in the machining zone; and
   control means for controlling said brake means, feeding means and cutting means such that said cutting means cuts off the wire electrode after the brake means applies the braking power during cutting to said pulley and said feeding means applies a feeding power in said direction to the wire electrode to thereby apply the tension to the wire electrode between said pulley and said feeding means, said control means further controlling said feeding means such that said feeding means continuously applies the feeding power in said direction to the wire electrode after the wire electrode is cut by said cutting means to thereby dispose of the cut-off wire electrode in said disposal box.

2. The wire-cut electrical discharge machine as claimed in claim 1, wherein said brake means comprises a magnetic break by which the braking power applied is controlled by changing the voltage applied to the magnetic brake.

3. The wire-cut electrical discharge machine as claimed in claim 1, further comprising moving means for changing the position of the feeding means and the disposal box relative to one another to bring them into alignment for disposal of the cut-off wire electrode.

4. The wire-cut electrical discharge machine as claimed in claim 3, wherein said moving means moves said feeding means to align said feeding means with said disposal box.

5. The wire-cut electrical discharge machine as claimed in claim 1, wherein said feeding means comprises:
   a drive roller;
   a motor for driving said drive roller;
   a movable pinch roller; and
   means for moving said pinch roller so as to engage the wire electrode between said drive roller and said pinch roller.

6. A method for cutting a wire electrode of an electrical discharge cutting machine, comprising the steps of:
   determining a breakage in the wire electrode;
   rewinding the wire electrode toward a supply spool;
   detecting when a broken end of the wire electrode has passed a predetermined point;
   stopping rewinding of the wire electrode;
   aligning a feed path of the wire electrode with a disposal portion;
   engaging a lead end of the wire electrode by a feeding means;
   providing a feeding power to feed the wire electrode in a feeding direction;
   applying a brake to halt the feeding of the wire electrode after a predetermined time while the feeding power is continuously supplied for the feeding of the wire electrode in the feeding direction;
   positioning a cutting element;
   cutting off a damaged portion of the wire electrode; and
   recommencing feeding of the damaged portion of the wire electrode in the feeding direction.

7. The method as claimed in claim 6, further comprising the steps of:
   detecting the damaged portion of the wire electrode has been cut off;
   withdrawing the cutting element; and
   disengaging the feeding means from the wire electrode.

8. The method as claimed in claim 7, further comprising the steps of:
   realigning the feed path of the wire electrode to be aligned with a workpiece cutting feed path; and
   commencing feeding the wire electrode to a workpiece cutting area by engaging the wire electrode with a second feeding means.

9. A device for cutting a wire electrode of an electrical discharge cutting machine, comprising:
   means for determining a breakage in the wire electrode;
   means for rewinding the wire electrode toward a supply spool;

means for detecting when a broken end of the wire electrode has passed a predetermined point;

means for stopping rewinding of the wire electrode;

means for positioning a feed path of the wire electrode to be aligned with a disposal portion;

means for engaging a lead end of the wire electrode by a feeding means;

means for providing a power to feed the wire electrode in a feeding direction;

means for applying a brake to halt the feeding of the wire electrode after a predetermined time while the feeding power is continuously supplied for the feeding of the wire electrode in the feeding direction;

means for positioning a cutting element;

means for cutting off a damaged portion of the wire electrode; and means for recommencing feeding of the damaged portion of the wire electrode in the feeding direction.

10. The device as claimed in claim 9, further comprising:

means for detecting the damaged portion of the wire electrode has been cut off;

means for withdrawing the cutting element; and means for disengaging the feeding means from the wire electrode.

11. The device as claimed in claim 10, further comprising:

means for realigning the feed path of the wire electrode to be aligned with a workpiece cutting feed path; and means for commencing feeding the wire electrode to a workpiece cutting area by engaging the wire electrode with a second feeding means.

12. An apparatus mounted on a main frame of an electrical discharge cutting machine, for cutting a wire electrode of the machine, comprising:

a frame movably mounted to the main frame;

means for moving said frame;

cutting means for cutting the wire electrode;

first feeding means for feeding the wire electrode mounted on said frame downstream of said cutting means in a direction of feed of the wire electrode;

a sensor mounted on said frame downstream of said first feeding means;

a wire guide mounted on said frame downstream of said sensor;

a processing passage downstream of said wire guide; and a disposal box downstream of said wire guide, wherein said moving means moves said frame to position said wire guide over a one of said processing passage and said disposal box based upon whether the wire electrode is being fed to a machining zone or being cut after being broken respectively.

13. The apparatus as claimed in claim 12, further comprising a second feeding means for feeding the wire electrode mounted on said frame upstream of said cutting means for feeding the wire electrode during a feeding operation.

14. The apparatus as claimed in claim 13, further comprising control means for controlling a one of a cutting operation and the feeding operation.

15. The apparatus as claimed in claim 14, wherein said first feeding means and said second feeding means each comprise:

a drive roller;

a motor for driving said drive roller;

a movable pinch roller; and means for moving said pinch roller so as to engage the wire electrode between said drive roller and said pinch roller.

16. The apparatus as claimed in claim 12, wherein said cutting means comprises:

a pair of welding electrodes; and means for moving said welding electrodes into contact with the wire electrode.

17. The apparatus as claimed in claim 12, wherein said frame is slideably mounted to the main frame so as to slide in a direction transverse to the direction of feed of the wire electrode.

18. The apparatus as claimed in claim 13, wherein said means for moving said frame comprises:

a moving motor; and a screw shaft threadably connected to said frame.

* * * * *